United States Patent [19]
Lyons

[11] 3,751,863
[45] Aug. 14, 1973

[54] EXTENSIBLE STRUCTURAL MEMBERS

[75] Inventor: John Alexander Lyons, London, England

[73] Assignee: Creative Engineering Limited, London, England

[22] Filed: Nov. 19, 1971

[21] Appl. No.: 200,471

[30] Foreign Application Priority Data
Nov. 20, 1970 Great Britain............55427/70

[52] U.S. Cl............ 52/111, 52/121, 52/123, 52/632, 52/645, 182/152
[51] Int. Cl............................................. E04h 12/34
[58] Field of Search ........... 52/109–111, 114, 121, 52/117, 119, 632, 123, 71, 645; 182/40, 41, 152

[56] References Cited
UNITED STATES PATENTS

| 3,457,685 | 7/1969 | Stern | 182/41 |
| 3,593,481 | 7/1971 | Mikulin | 52/121 |
| 2,982,379 | 5/1961 | Fisher | 52/111 |
| 1,772,822 | 8/1930 | White | 52/645 |
| 849,222 | 4/1907 | Fleming | 52/111 |
| 799,163 | 9/1905 | Hubbard | 182/41 |
| 669,492 | 3/1901 | Gill | 52/111 |
| 999,126 | 7/1911 | Sistermann | 52/111 |
| 1,319,943 | 10/1919 | Bessolo | 52/121 |
| 1,511,679 | 10/1924 | Schwartz | 52/109 |
| 2,806,747 | 9/1957 | Jaeger | 182/152 |

Primary Examiner—Frank L. Abbott
Assistant Examiner—Leslie A. Braun
Attorney—Watson, Cole, Grindle & Watson

[57] ABSTRACT

A self-erecting tower structure, for example, for overhead inspection and for supporting lights, aerials, antennas, and cameras. The structure includes an extensible member comprising a number of superimposed frames and self-erecting legs interconnecting the frames and erecting means, such as endless chains or a screw-threaded column, arranged to raise each of the frames in succession through a distance at least equal to the length of the legs.

11 Claims, 11 Drawing Figures

Patented Aug. 14, 1973 3,751,863

EXTENSIBLE STRUCTURAL MEMBERS

This invention relates to extensible apparatus. The invention relates particularly, although not exclusively, to extensible towers such as may be used to carry out overhead maintenance work, to raise loads or to support lights and aerials.

Various forms of extensible apparatus have already been proposed but these have all suffered from one disadvantage or another. For example, telescopic members which may be extended hydraulically, pneumatically or mechanically are well known. However, in these cases the extension factor is quite low and the extended length rarely exceeds three times the unextended length. Platforms raised by linkages of scissor form have been proposed but these either have low extensions or low stiffness. Other proposals have been extremely complicated while providing structures which are far from stiff and many of them occupy a considerable amount of space when in the unextended condition.

Accordingly, it is an object of the present invention to provide an extensible apparatus which is of simple and inexpensive construction and which, in its extended condition, has great stiffness or rididity, and which occupies relatively little volume when it is unextended.

According to the present invention, apparatus includes: an extensible member comprising a number of frames and self-erecting legs interconnecting the frames; and erecting means arranged to raise each of the frames in succession through a distance at least equal to the length of the legs. In use, therefore, from a stack of superimposed frames the frames are successively raised by a distance sufficient to erect the legs so that the extensible member is progressively extended.

The legs may take various forms. For example, they may be telescopic or folding. However, preferably each leg is pivoted to one frame at one end and is slidably connected at the other end to an adjacent frame. This arrangement of legs may be used independently of the erecting means referred to above. In this arrangement, and in the unextended condition of the structure the frames may be close to one another or touching one another with the legs lying approximately parallel with the planes of the frames. As the frames are drawn apart the legs will be guided to positions in which they are perpendicular to the planes of the frames. The frames are preferably polygonal and may be square or rectangular and there is preferably a leg at each corner of each frame. Each frame preferably has cross-bracing in the plane of the frame and this may take the form of one or two diagonal bracing rods or a stressed skin.

Aligned legs from successive bays preferably interlock, for example by means of a projection on the end of one leg which interengages with a notch on the adjacent end of the adjacent leg.

There may be collapsible diagonal bracing in each bay of each longitudinal face of the structure when the structure is extended, that is to say in each opening which is bounded by two adjacent frames and by two adjacent legs connecting those frames. This diagonal bracing may be formed by telescoping or folding rigid elements but is preferably afforded by flexible ligatures such as cables.

The erecting means may take various forms, but in one advantageous construction it comprises at least one endless flexible element such as a chain having a pass extending parallel with the direction of extension of the extensible member and having spaced abutments arranged to engage the frames successively. In another possible construction, the erecting means comprises a rotary externally-threaded element extending in the direction of extension of the extensible member, each frame having an internal screw-thread arranged to mesh with the screw-thread on the externally screw-threaded element.

The invention can be adapted to many different purposes, some of which have already been mentioned briefly. The invention is particularly suitable for the provision of a load bearing column or tower which may be used, for example, for the support of an aerial, light or camera. The act of extending the column may be used to raise loads or persons. Thus the structure may be used as a means of access to high locations as for roof or lighting maintenance or erection. The apparatus may be constructed with sufficient strength and rigidity that it can support a cantilevered work platform so that, for example, a workman can be supported in a position outside the boundaries of the extensible member.

The invention may be carried into practice in various ways but one extensible structure forming a tower, the erecting means for the tower and a modified erecting means will now be described by way of example with reference to the accompanying drawings, in which.

Figure 2:
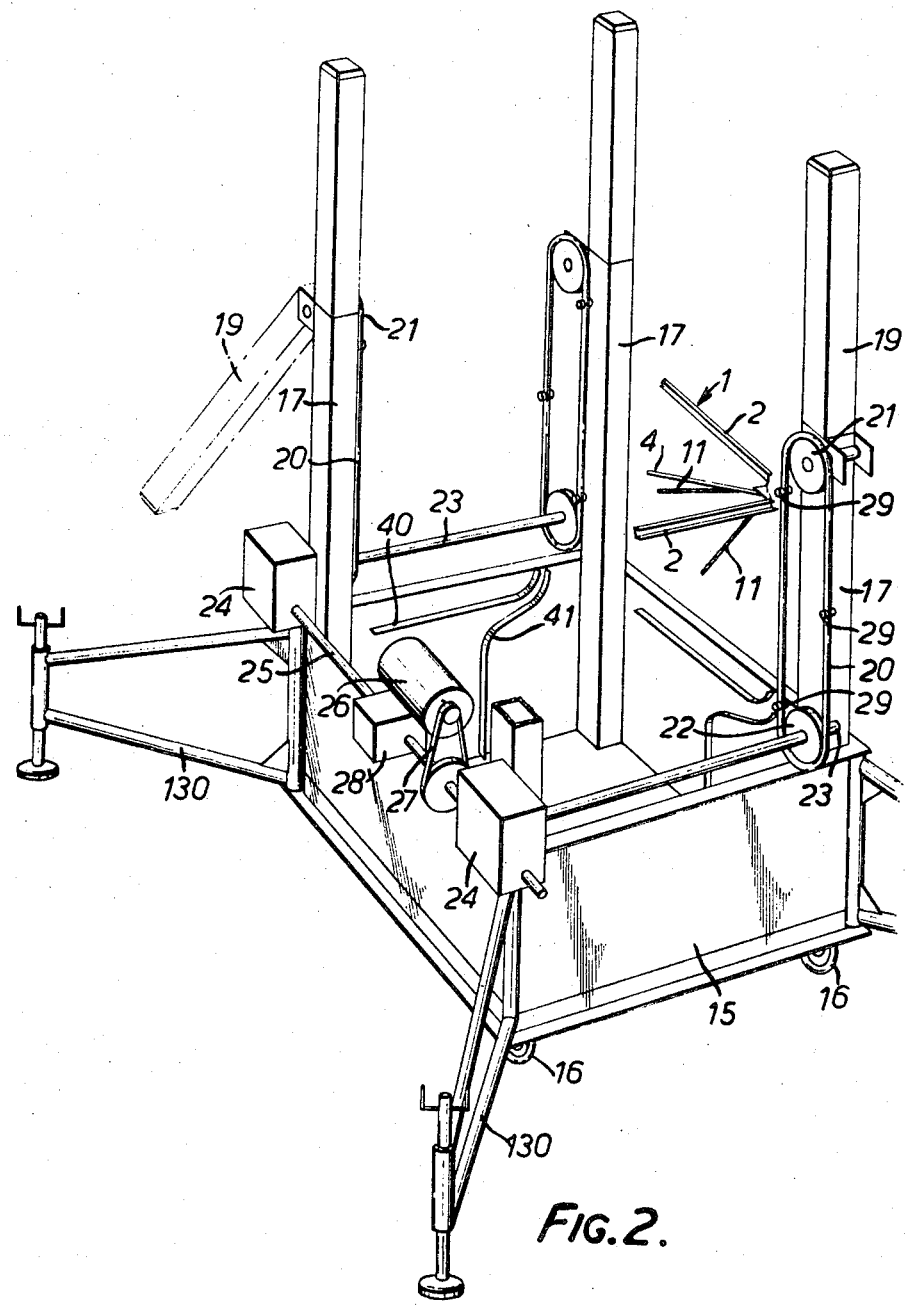
FIG. 2 is a diagrammatic perspective view of the extending means with the extensible structure omitted save for one corner of a single frame, this corner being indicated by the arrow II in FIG. 1.
Figure 4:
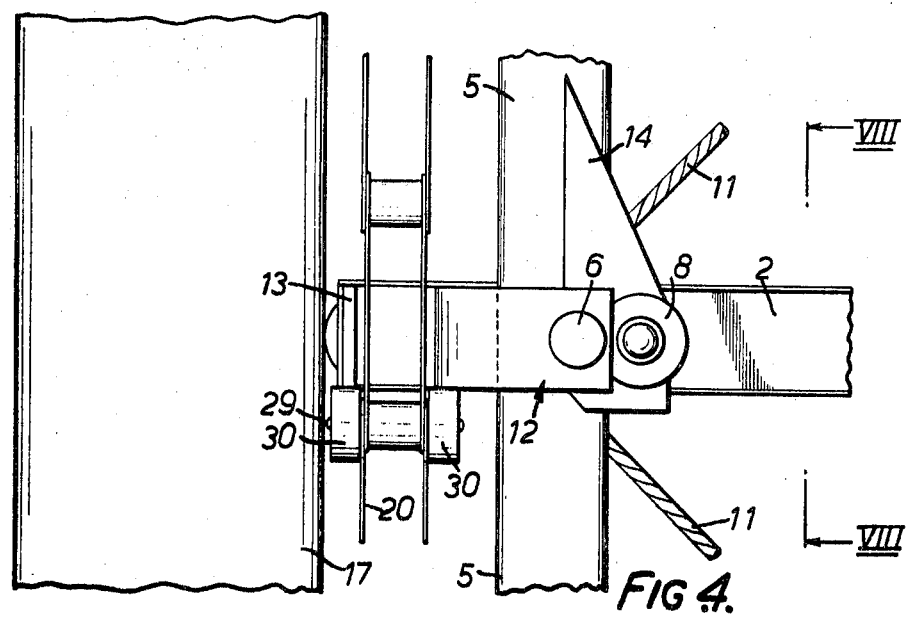
FIG. 4 is a detail elevational view of the corner shown in FIG. 3 viewed in the direction of the arrows IV in FIG. 3.
Figure 5:
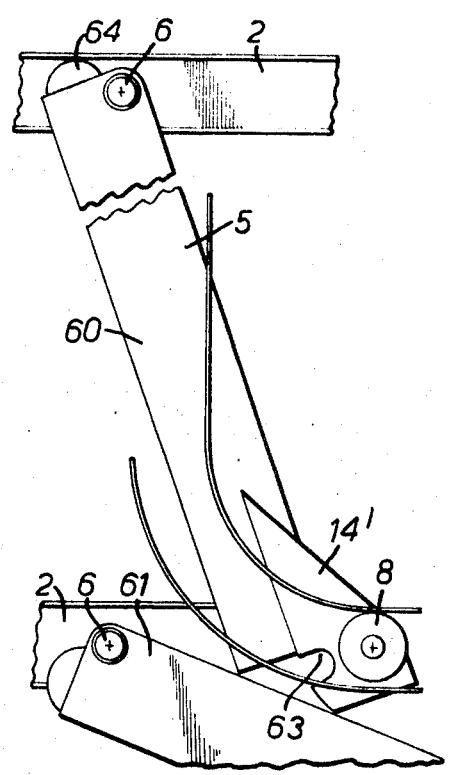
Figure 6:
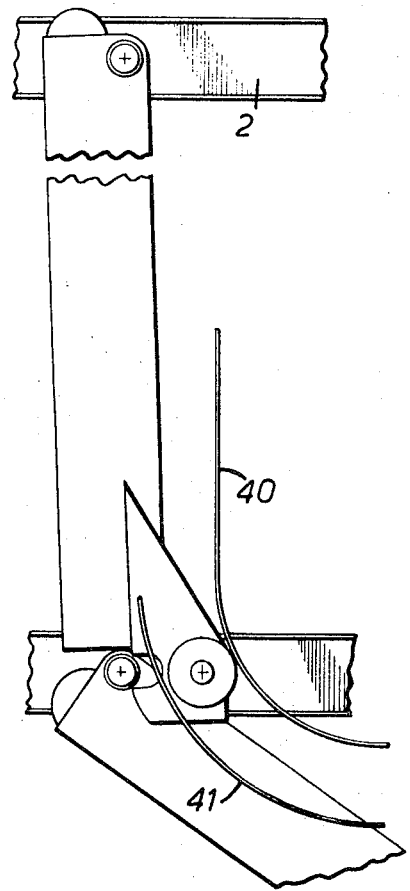
Figures 7, 8:
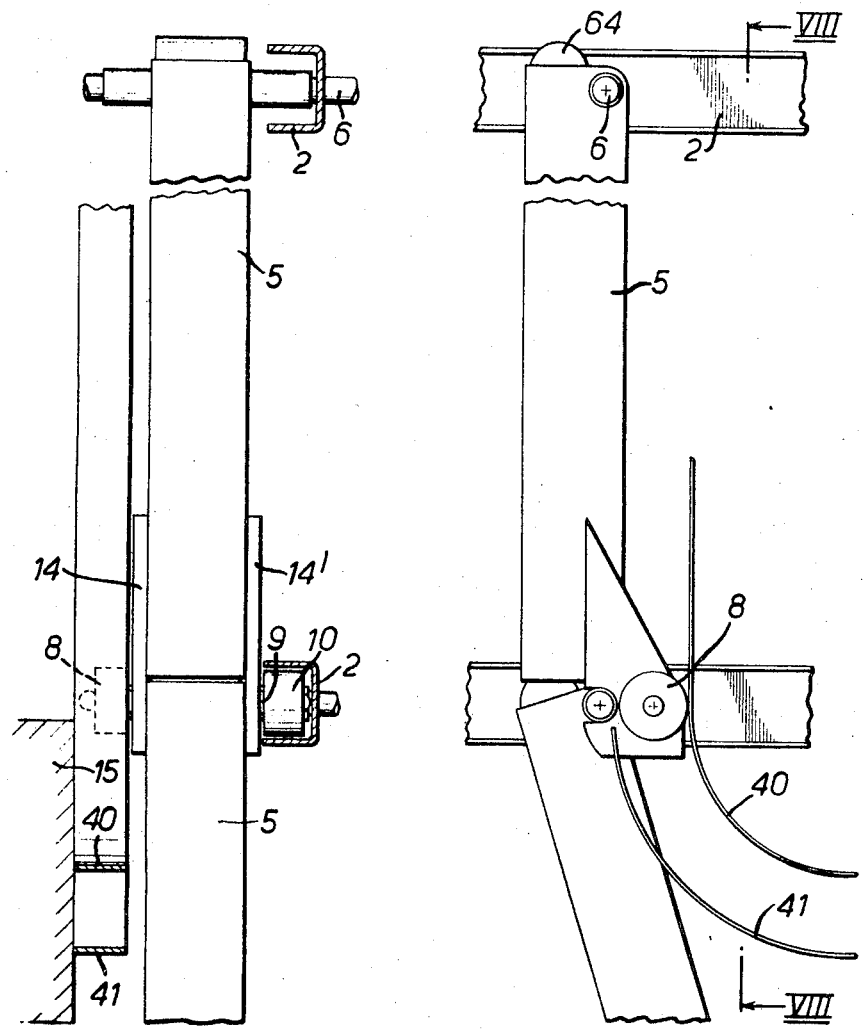
Figure 9:
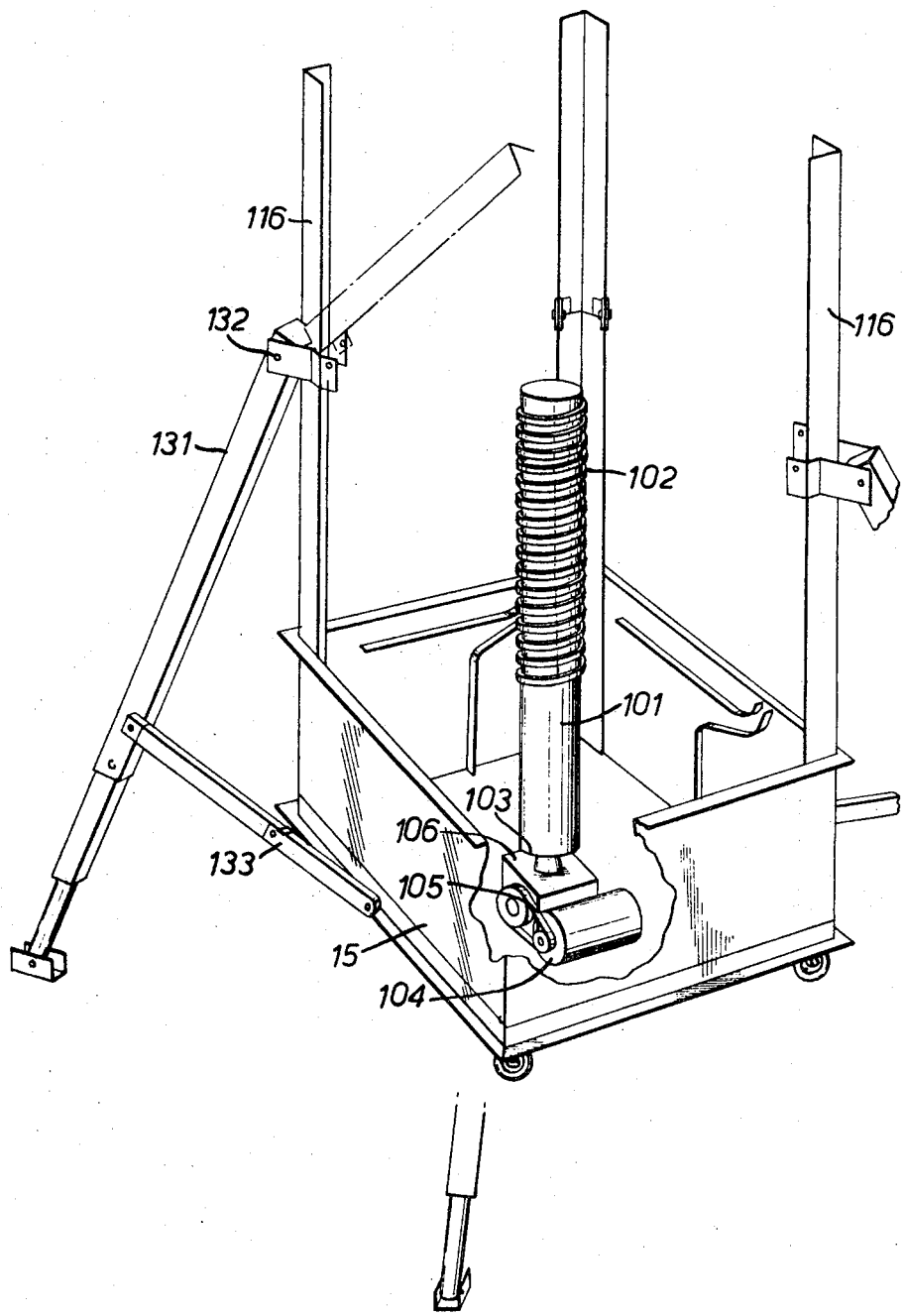
Figure 10:
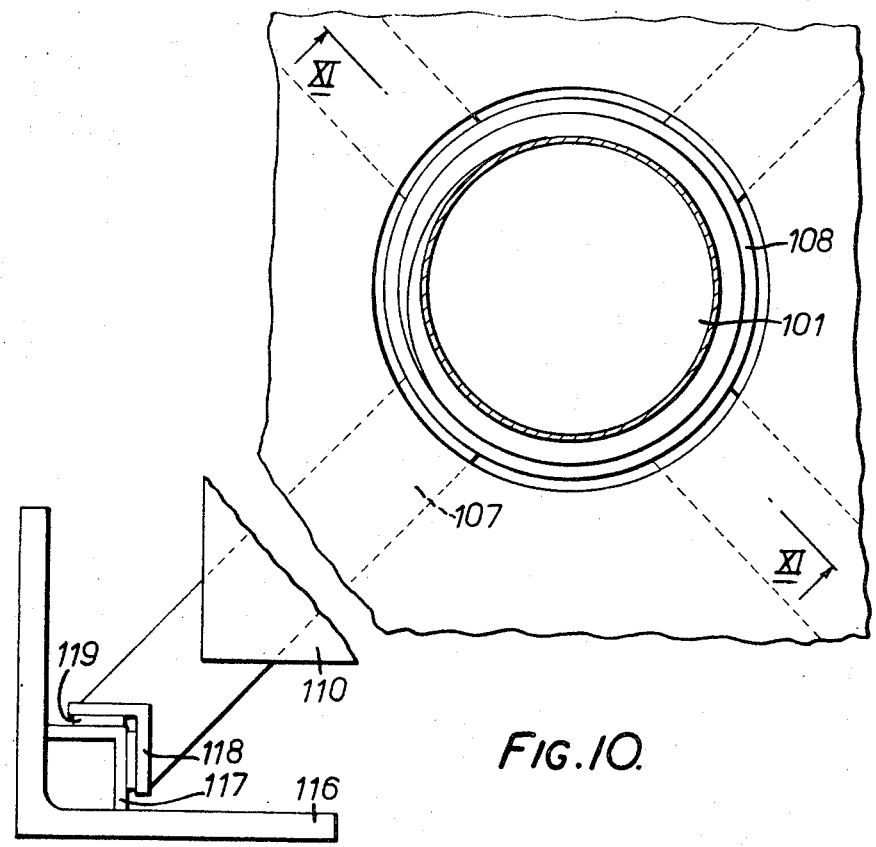
Figure 11:
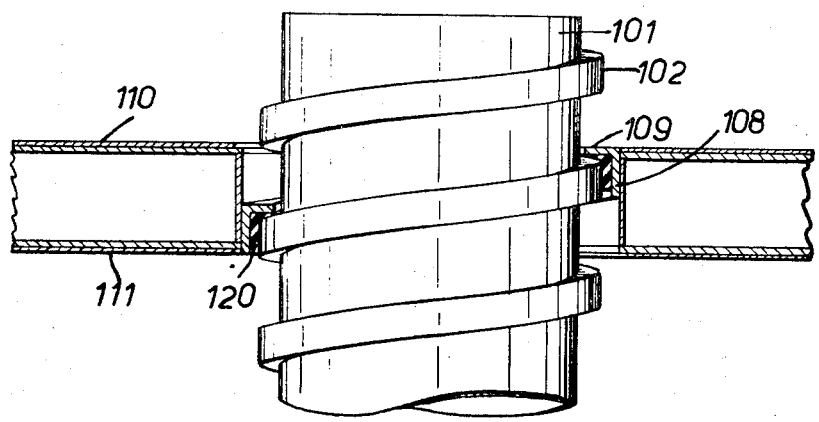

FIGS. 5, 6, and 7 show successive positions of the ends of two adjacent legs during extension, the position of FIG. 7 being that which is reached shortly before that of FIG. 4;

FIG. 8 is a section on the line VIII—VIII in FIG. 7, which line is also indicated in FIG. 4;

FIG. 9 is a diagrammatic perspective view similar to FIG. 2 of an alternative form of extending means;

FIG. 10 is a detail plan view to a larger scale of the extensible structure in the extending means of FIG. 9; and FIG. 11 is a section on the line XI—XI in FIG. 10.

The particular structures to be described form towers or columns and will be described in relation to this use, although it will be appreciated that similar structures can be used for inclined operation.

Reference will now be made to the extensible structure and extending means shown in FIGS. 1 to 8. Each bay of the structure comprises essentially a square frame and four legs. Thus, the upper bay shown in FIG. 1 consists of a square frame 1 of four channel members 2 with the channels opening outwardly. The channels are connected at the corners by plates 3 which are welded to the channels. Opposite corners of the frame are connected by diagonal rods 4 providing bracing. At each corner of the frame 1 there is an L-shaped bracket 12 which is welded to one of the channels and there is a leg 5 which is pivoted at its upper end on a pin 6 which extends between the bracket 12 and the channel 2. The leg 5 can pivot between a downwardly extending vertical position and a position in which it is almost horizontal and lies alongside one of the channels 2. On the outer side of each leg at the lower end there is a triangular plate 14 to which is fixed a pin 7 carrying an outer wheel 8 whose purpose will be described below and on the inner side of each leg at the lower end there is another triangular plate 14' to which is fixed a pin 9 carrying an inner wheel 10 which runs in the track afforded between the flanges of the corresponding channel 2 of the frame immediately below. Each corner of the frame 1 is connected to corners of the frame immediately below by diagonal cables 11.

Figure 1:
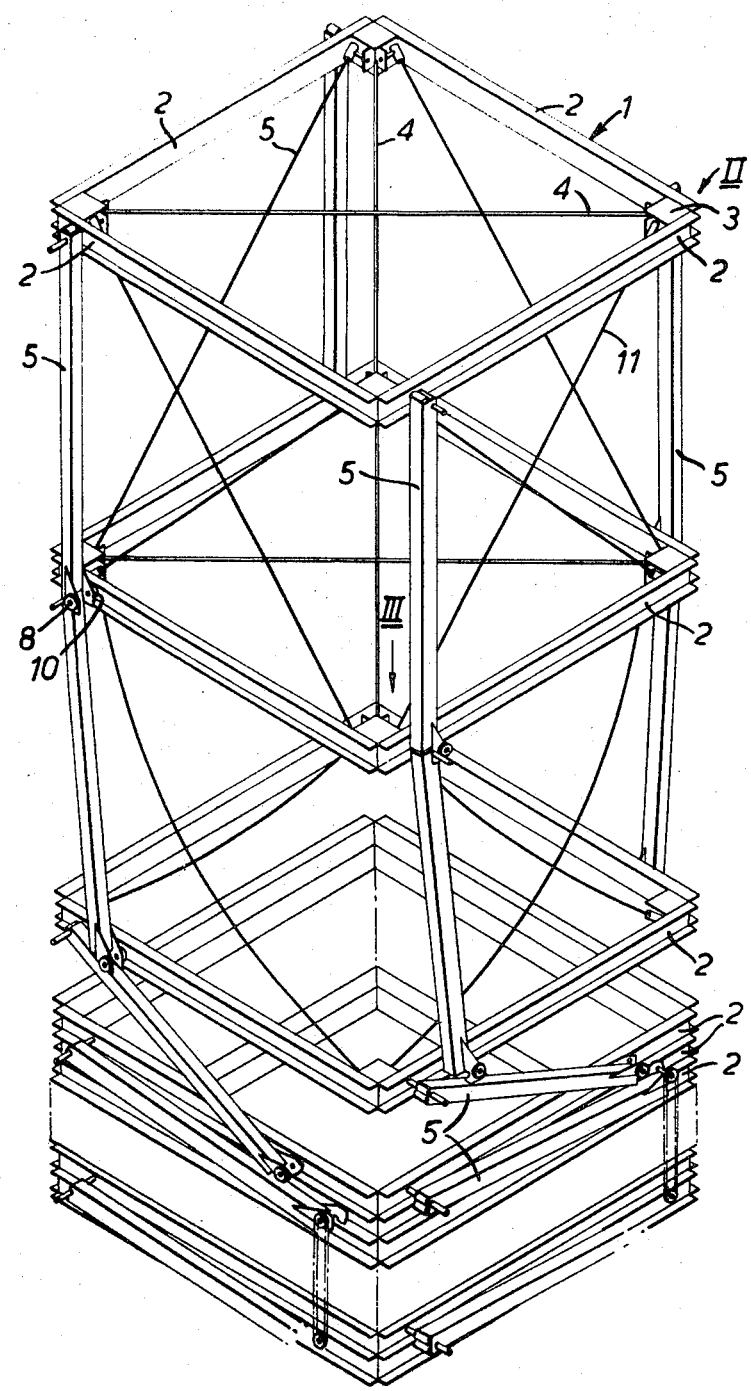
FIG. 1 is a purely diagrammatic perspective view of the extensible structure as it is held within the extending means but with the extending means omitted for reasons of clarity and showing the extensible structure with one bay fully erected, two bays partially erected and a number of bays unerected.

As can be seen from the bottom part of FIG. 1, in the unextended condition of the tower the frames 1 rest on one another with the legs 5 lying almost parallel with the frames. As can be seen from the middle portion of FIG. 1, as a frame is raised away from the frame immediately below it the inclination of the legs progressively increases as the upper ends of the legs are moved upwards while the lower ends are prevented from rising by the frame immediately below, the lower ends of the legs being guided horizontally by wheels 10 moving along the tracks formed by the channels of the lower frame. Finally the legs will reach a vertical position at which stage the diagonal bracing cables 11 will be taut. The upper and lower frames together with the legs 5, the diagonal bracing rods 4 and the diagonal bracing cables 11 then constitute a rigid parallelepiped. Bays are erected in this manner successively until the tower is fully erected.

FIG. 2 shows the means by which the tower is erected. The stack of frames 1 formed when the tower is lowered are contained in an open-topped square box 15 which is mounted on castors 16. At the corners of the box there are four vertical posts 17. The posts extend above the box with upper parts 19 which can be folded down when not required to reduce head room. Each post supports an endless roller chain 20 moving over upper sprockets 21 and lower spockets 22. The chains are arranged in pairs facing each other and the lower sprockets of each pair are interconnected by cross shafts 23 which extend from worm-and-screw gearboxes 24 the screws of which are mounted on a shaft 25 driven by an electric motor 26 through a belt drive 27. The shaft 25 carries an automatic brake 28 which is automatically engaged when no current is flowing to the motor and thus acts as a safety device. Each of the chains 20 has three pins 29 spaced apart by distances equal to the height of an erected bay which pins extend on either side of the side plates of the chain and carry rollers 30 which are arranged to engage under one of the brackets 12 and an L-shaped extension 13 thereof. As seeen in FIG. 2, one pair of rollers 30 is about to become disengaged from a bracket 2 while another pair of rollers is about to come into engagement with a bracket of the frame immediately beneath. It will be understood that by this means the frames are erected successively with a continuous and smooth movement, until the tower is fully erected.

On each inner face of the walls of the box 15 there are guides 40, 41 which are formed by strips and which cooperate with the outer wheels 8 carried by the pins 7 at the lower ends of the legs 5 and these guides assist the tracks formed by the channels 2 to direct the lower ends of the legs towards the ends of the tracks so that the legs attain their final vertical positions and, more importantly, guide the lower ends in the opposite direction when the tower is to be lowered.

Figure 3:
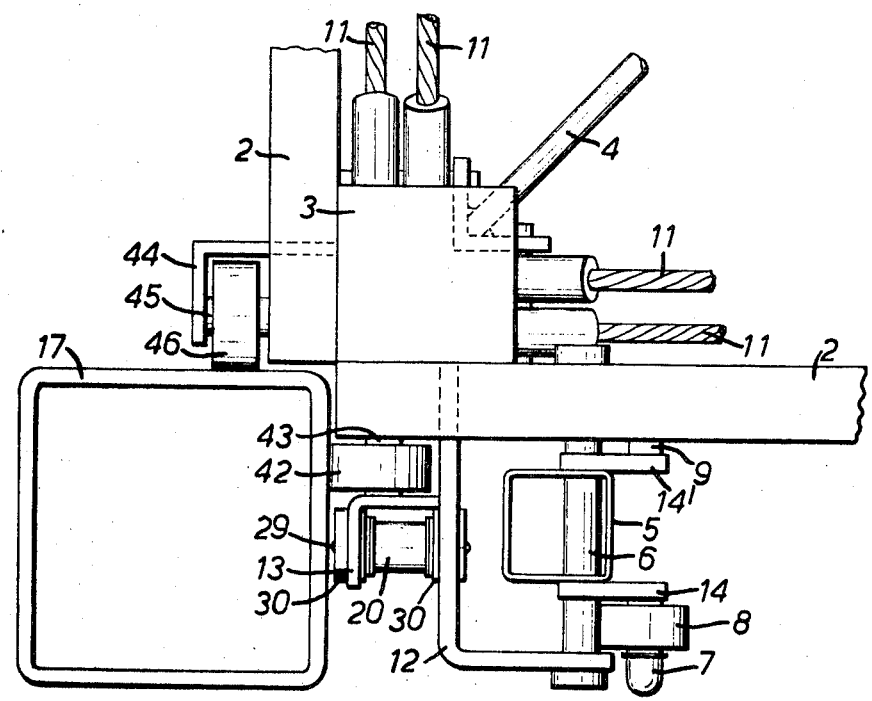
FIG. 3 is a detail plan view of one corner of one frame within the extending means, this corner being indicated by the arrow III in FIG. 1.

FIGS. 3, 4 and 8 show one corner of one of the bays at a level in the lifting apparatus such that one pair of rollers 30 is engaged with the bracket 12 and extension 13 at the corner. It will be seen that a roller 42 is mounted on a pin 43 which extends between the extension 13 and the adjacent channel 2 while the other channel at the corner carries another L-shaped bracket 44 which supports one end of a pin 45 on which a second roller 46 is mounted. The rollers 42 and 46 engage adjacent faces of one of the posts 17.

FIGS. 5, 6 and 7 show in successive positions two super-adjacent legs and the way in which they interlock. In FIG. 5 the upper leg 60 is approaching the vertical while the lower leg 61 is still at an angle of approximately 70° to the vertical. In FIG. 6 the upper leg has almost reached the vertical position and is beginning to interengage with the lower leg while in FIG. 8 the upper leg is vertical, the lower leg is almost vertical and the legs are interlocked. It will be seen that the plates 14 and 14' at the lower ends of the legs have notches 63. The upper end of each leg carries a part-cylindrical spigot 64 which has a length axially of the cylinder equal to the internal width dimension of the leg. It will be seen from the drawings that during erection the pin 6 by which the lower leg is pivoted to the frame 1 to which it is attached enters the notches 63 of the upper leg and the spigot 64 at the upper end of the lower leg enters the socket formed by the open lower end of the upper leg so that when the position of FIG. 7 is reached the legs are locked to one another. Thus, the upper leg is prevented by the spigot 64 from moving to the right which is the direction in which it has to move to collapse the bay. It only becomes free to move to the right when the lower leg has already become inclined to the vertical. It is then guided to the right by the appropriate guide 41 in the box 15.

FIGS. 9 – 11 show a modified version of the extensible member and the extending means. These are of similar construction to those already described and only the ways in which they differ from those described will be set out in detail. Instead of employing endless chains having projections acting on brackets on the frames to provide the means for erecting the extensible member, the construction shown in FIG. 9 employs a rotary screwthreaded column engaging screw-thread elements carried at the centres of each of the frames. Thus, as seen in FIG. 9, the base carries a hollow rotary column 101 which is formed on the outside with a square-section screw-thread 102 which starts at a level which is the level of the top frame when the tower is completely lowered and is somewhat above the bottom 103 of the column. The column can be rotated by an electric motor 104 through a belt drive 105 and a gear box 106 which also provides a thrust bearing, not shown, on which the column is mounted. As can be seen from FIGS. 10 and 11, each frame has four diagonal members 107 extending from the corners of the frame towards the centre of the frame where they are connected to a ring 108. A female screw-thread on the frame is afforded by an angle-section element 109 which is welded to the ring and is shaped to form a helix which matches the screw-thread 102 on the column 101. The frames are stiffened by upper and lower skins 110 and 111 fastened to the diagonal members 107.

When the extensible member is completely lowered the uppermost frame will have its helix element 109 engaging with the bottom turn of the thread 102 of the column 101. As the column is rotated, the uppermost frame will be raised until the legs 5 are erected as described in relation to FIGS. 5 to 7 and the helical element 109 of the next frame engages the threads 102. Thus, the frames successively engage the thread 102 as the extensible member is erected. It will be apparent that the frames become disengaged from the top of the column shortly after the legs connecting them to the next frame beneath have become fully erected.

In this construction the columns 116 at the corners of the erecting means are in the forms of angles with smaller angles 117 in the corners. Each diagonal member 107 extends beyond the corner of the frame 1 and at its outer end it carries a small angle piece 118, the faces of which carry rubbing strips 119 of polytetrafluoroethylene (P.T.F.E.). The helical element 108 may also have P.T.F.E. rubbing strips 120.

It will be seen from FIGS. 2 and 9 that the erecting means may have stabilising legs which can be retracted. In the case of FIG. 2, the legs 130 can be swung about vertical pivots at their inner ends so that they lie flat against the sides of the box 15. In the case of FIG. 9, the legs 131 are telescopic and are connected to the columns 116 by horizontal pivots 132 at their upper ends and have folding struts 133.

What we claim as our invention and desire to secure by Letters Patent is:

1. An extensible tower apparatus comprising:
a plurality of polygonal planar superimposed frames, each frame including a number of frame members forming the sides of the polygon;
a number of legs equal to the product of the number of frames and the number of sides to each frame, each leg being rigid throughout its length and each leg being pivoted at one end to one of said frames adjacent one corner of said frame about an axis which permits the leg to pivot between a first position in which it is substantially alongside one of the frame members of said frame and a second position in which it is perpendicular to the plane in which said frame lies, and each leg being slidably and pivotally connected to that frame member of the adjacent frame which is immediately below said one frame member to be movable between a first position in which it is alongside said second mentioned frame member and a second position in which it is perpendicular to the plane of said adjacent frame; and erecting means having movable abutment means engageable with said frames whereby each of said frames in succession is raised through a distance at least equal to the length of said legs whereby said legs are moved from their first positions to their second positions.

2. Apparatus according to claim 1 in which said frame members are each of channel section, and said slideable connections each comprising slide means carried by said legs and slideable in the channels of said channel sections.

3. Apparatus according to claim 2 in which said erecting means includes guides arranged to urge said slide means along said channels as said frames are raised or lowered.

4. Apparatus according to claim 1 in which each frame has cross-bracing in the plane of the frame.

5. Apparatus according to claim 1 in which adjacent legs which are aligned when said extensible member is extended have interlocking means.

6. Apparatus according to claim 5 in which said interlocking means comprises a projection on the end of one leg and a notch to receive said projection on the adjacent end of the adjacent leg.

7. Apparatus according to claim 5 in which said interlocking means includes a spigot on the end of one leg and a corresponding socket on the end of the adjacent leg.

8. Apparatus according to claim 1 which includes collapsible diagonal bracing in each bay of each longitudinal face of the structure.

9. Apparatus according to claim 8 in which said diagonal bracing is formed by flexible ligatures.

10. Apparatus according to claim 1 in which said erecting means comprises at least one endless flexible element having a pass extending parallel with the direction of extension of said frames and having spaced abutments arranged to engage said frames successively.

11. Apparatus according to claim 1 in which said erecting means comprises a rotary externally screw-threaded element extending in the direction of extension of said frames, each frame having an internal screw-thread arranged to mesh with said screw-thread on said externally screw-threaded element.

* * * * *